UNITED STATES PATENT OFFICE.

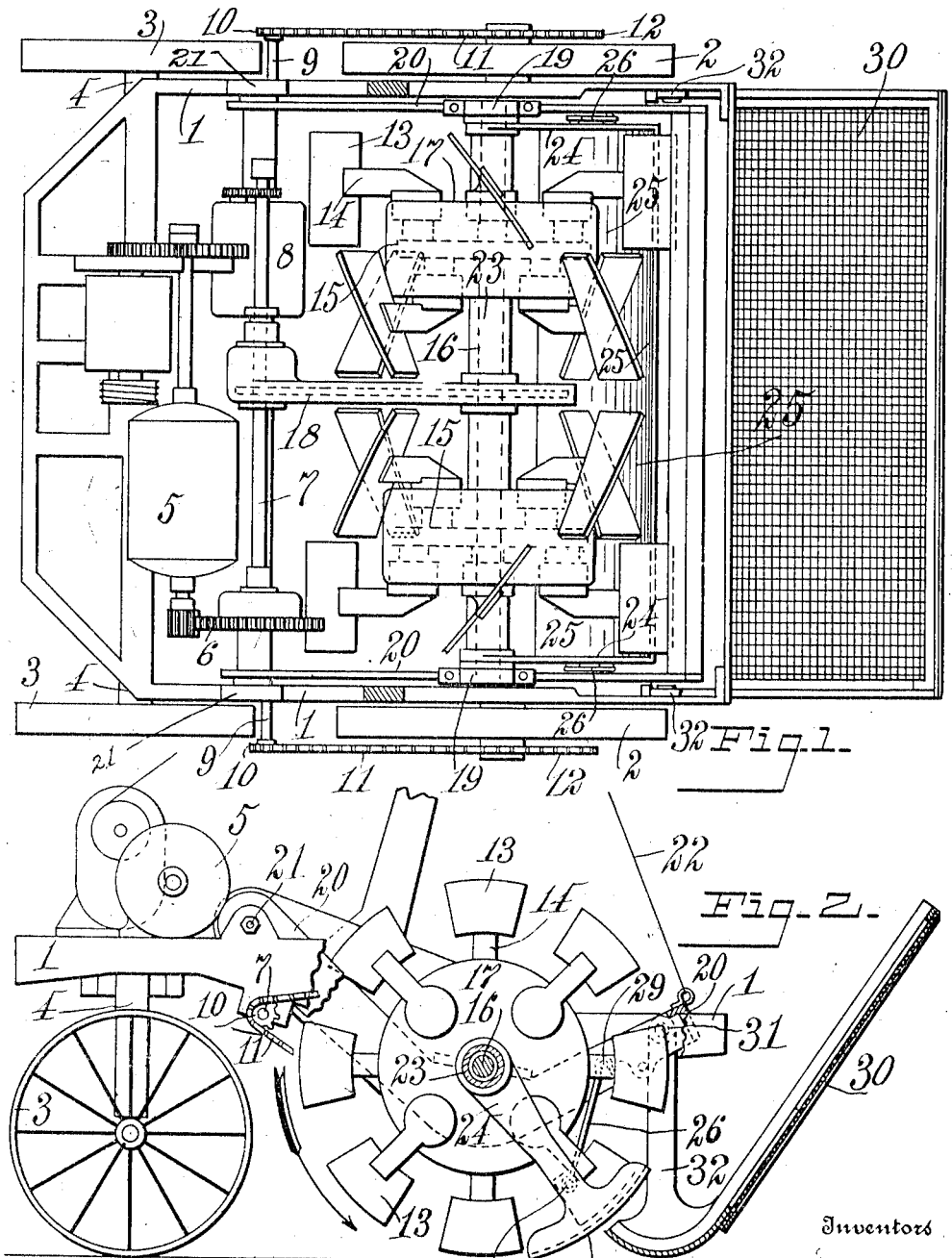

JOHN F. O'BRIEN AND GEORGE F. BOWDLE, OF PIQUA, OHIO.

SAND CUTTING AND RIDDLING MACHINE.

1,081,769. Specification of Letters Patent. Patented Dec. 16, 1913.

Application filed March 15, 1913. Serial No. 754,650.

*To all whom it may concern:*

Be it known that we, JOHN F. O'BRIEN and GEORGE F. BOWDLE, citizens of the United States, residing at Piqua, in the county of Miami and State of Ohio, have invented certain new and useful Improvements in Sand Cutting and Riddling Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sand-cutting and riddling machines for foundry use.

The present invention comprises an attachment for the sand-cutting and riddling machine shown and described in Letters Patent No. 1,033,378, dated July 23, 1912. The attachment may be used with any sand-cutting machine utilizing a plurality of revolving blades or shovels.

The object of the invention is to provide an attachment for a rotating shovel sand-cutting machine whereby all of the sand is raised from the floor and thrown into the air, thereby thoroughly disintegrating the same and permitting it to be caught by a sieve in which it is riddled.

Referring to the accompanying drawings, Figure 1 is a top plan view of a sand-cutting machine showing our present invention applied thereto; and Fig. 2 is a side elevation of the same with parts broken away.

In the specification and drawings, similar reference characters indicate corresponding parts.

Referring more particularly to the drawings, 1 represents a frame which is supported on rear tractors or wheels 2 and front steering wheels 3 through a yoke 4 which is adapted to pass over a sand heap. The machine is driven forward by any well known means such as that described and shown in our patent above referred to, and consisting of a motor 5 mounted on the frame and connected to the tractors 2 through gears 6, shaft 7, transmission gear 8, shaft 9, pinions 10, chains 11 and sprockets 12 attached to the tractors.

When the machine is propelled forward, over a sand heap, the sand is cut and disintegrated by a plurality of revolving blades or shovels 13 mounted on arms 14 attached to members 15 mounted on a shaft 16 as is more fully shown and described in the patent hereinbefore referred to. The members 15 are mounted in drums 17 and the shaft 16 is journaled in bearings 19 on a frame 20. The shaft 16 is driven from the shaft 7 through a sprocket chain 18, shown in broken lines in Fig. 1. The frame 20 is pivoted at 21 to the frame 1 and is supported by the main frame 1 by said pivot 21 and a cable 22.

The arrangement of the various parts above described is such that the machine is propelled forward and the shovels are rotated to cut the sand by the motor 5. All of the above described mechanism is more fully shown and described in the patent above referred to, it being understood that this portion of the present invention may be represented by any type of revolving shovel sand-cutting machines. However, it has been found in machines of this type, that the major portion of the sand is not picked up by the shovels but is pushed along on the floor or ground. This retards the action of the shovels and prevents the sand being thrown in the air to thoroughly disintegrate the same, and prevents the sand being thrown against the sieve to riddle the same.

To direct the sand off the floor or ground when engaged by the shovels, the following device is provided. Journaled on and extending from sleeves 23, which surround shaft 16, are rocker arms 24 to the outer ends of which are attached a curved plate 25. This plate 25 follows the path of the outer edge of the shovels 13 and lies in close proximity thereto. The lower edge of the said plate 25 lies adjacent to the floor while the chord described by the opposite edges of the plate is at such an angle that the sand is scooped onto the plate and then thrown into the air by the shovels, thereby thoroughly disintegrating the sand. The plate 25 may be suspended by any well known means such as links 26 which are attached to the arms 24 at 27 and to the frame 20 at 29. Mounted in the rear of the machine is an inclined sieve 30 which is suspended from points 31 by depending arms 32. The sieve 30 is mounted in a position, relative to the shovels 13 and plate 25, to catch the sand when thrown by the shovels. Part of the sand will be thrown through the sieve while the remainder, falling down the incline, will pass through the meshes whereby all the sand shoveled is effectually riddled.

Having described our invention, we claim.

1. In a device of the type specified, the combination with a frame supported on wheels, and a plurality of rotating sand-cutting blades carried by said frame, of a sand deflector mounted adjacent to said blades and adapted to direct the sand upwardly and rearwardly when cut by said blades.

2. In a device of the type specified, the combination with a frame, tractors upon which said frame is mounted, a plurality of rotating cutting blades carried by said frame, and means for driving said tractors and rotating said cutting blades, of a plate mounted adjacent to said blades and adapted to direct the sand upwardly and rearwardly when cut by said blades, and a sieve mounted on the rear end of said frame and adapted to riddle the sand thrown by said blades and deflected by said plate.

3. In a device of the character specified, the combination with a frame mounted upon wheels, a series of rotating shovels mounted on said frame, and a sieve mounted on the said frame in the rear of said shovels, of a sand deflector suspended from the axis of said rotating shovels, and suspended connections between said deflector and said frame, substantially as specified.

In testimony whereof we affix our signatures, in presence of two witnesses.

JOHN F. O'BRIEN.
GEORGE F. BOWDLE.

Witnesses:
R. J. McCarty,
Matthew Siebler.